US012739075B2

(12) United States Patent
Yanagisawa et al.

(10) Patent No.: US 12,739,075 B2
(45) Date of Patent: Sep. 15, 2026

(54) WIRELESS COMMUNICATION CONTROL APPARATUS, WIRELESS COMMUNICATION SYSTEM, WIRELESS COMMUNICATION CONTROL METHOD, AND PROGRAM

(71) Applicant: NEC Corporation, Tokyo (JP)

(72) Inventors: Kei Yanagisawa, Tokyo (JP); Yu Tsumuraya, Tokyo (JP); Shuhei Mizuguchi, Tokyo (JP); Masayuki Takekawa, Tokyo (JP); Sawaka Seki, Tokyo (JP); Hideki Kikkawa, Tokyo (JP); Kota Tanizawa, Tokyo (JP); Eri Hosoo, Tokyo (JP); Kosei Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 357 days.

(21) Appl. No.: 18/606,169

(22) Filed: Mar. 15, 2024

(65) Prior Publication Data

US 2024/0322967 A1 Sep. 26, 2024

(30) Foreign Application Priority Data

Mar. 22, 2023 (JP) ................................ 2023-045839

(51) Int. Cl.
*H04W 36/22* (2009.01)
*H04B 7/026* (2017.01)
*H04L 5/00* (2006.01)

(52) U.S. Cl.
CPC .......... *H04L 5/0048* (2013.01); *H04B 7/026* (2013.01); *H04L 5/0098* (2013.01)

(58) Field of Classification Search
CPC . H04W 72/0453; H04W 72/23; H04W 36/00; H04W 84/00; H04W 84/045; H04W 88/06; H04W 88/08; H04W 16/02; H04W 16/01
See application file for complete search history.

(56) References Cited

FOREIGN PATENT DOCUMENTS

| | | | |
|---|---|---|---|
| JP | 2019-029842 A | 2/2019 | |
| JP | 2020-017815 A | 1/2020 | |
| JP | 2022-538891 A | 9/2022 | |
| KR | 102088422 B1 * | 3/2020 | .......... H04B 7/1555 |

OTHER PUBLICATIONS

Hangjin Cho, Base Station and Control Method Thereof, Mar. 12, 2020, (Year: 2020).*

* cited by examiner

*Primary Examiner* — Gary Lafontant
(74) *Attorney, Agent, or Firm* — Sughrue Mion, PLLC

(57) ABSTRACT

A wireless communication control apparatus includes at least one processor, the at least one processor carrying out: an information acquisition process of acquiring information pertaining to a terminal; and a switching control process of carrying out switching, based on the information pertaining to the terminal, between whether a base station causes a plurality of wireless slave stations to function respectively as a plurality of separate cells or causes the plurality of wireless slave stations to function as a single cell.

15 Claims, 14 Drawing Sheets

10
100
101
INFORMATION ACQUISITION SECTION
102
CONTROL SECTION
103
120
WIRELESS SLAVE STATION
121
WIRELESS SLAVE STATION
129
WIRELESS SLAVE STATION
130
131
139
140
150

20
200
201
INFORMATION ACQUISITION SECTION
202
CONTROL SECTION
203
120
WIRELESS SLAVE STATION
121
WIRELESS SLAVE STATION
129
WIRELESS SLAVE STATION
130
131
139
140
141
142
149
150

20
200
203
202
CONTROL SECTION
201
INFORMATION ACQUISITION SECTION
129
WIRELESS SLAVE STATION
149
130a
121
WIRELESS SLAVE STATION
142
130a
141
120
WIRELESS SLAVE STATION
140
130a 30
300
INFORMATION ACQUISITION SECTION
301
CONTROL SECTION
302
303
120
WIRELESS SLAVE STATION
121
WIRELESS SLAVE STATION
129
WIRELESS SLAVE STATION
130
140
141
150
142
131
139
149

60
603
600
INFORMATION ACQUISITION SECTION
601
CONTROL SECTION
602
DISTRIBUTOR
110
WIRELESS SLAVE STATION
120
WIRELESS SLAVE STATION
121
WIRELESS SLAVE STATION
129
140
141
142
149
150
130
131
139

60
600
INFORMATION ACQUISITION SECTION
601
CONTROL SECTION
602
603
DISTRIBUTOR
110
120
WIRELESS SLAVE STATION
121
WIRELESS SLAVE STATION
129
WIRELESS SLAVE STATION
130a
140
141
142
130a
130a
149

WIRELESS COMMUNICATION CONTROL APPARATUS, WIRELESS COMMUNICATION SYSTEM, WIRELESS COMMUNICATION CONTROL METHOD, AND PROGRAM

This Nonprovisional application claims priority under 35 U.S.C. § 119 on Patent Application No. 2023-045839 filed in Japan on Mar. 22, 2023, the entire contents of which are hereby incorporated by reference.

TECHNICAL FIELD

The present invention relates to a wireless communication control apparatus, a wireless communication system, a wireless communication control method, and a program.

BACKGROUND ART

Techniques have been disclosed in which, in a wireless communication system, a plurality of communication apparatuses form respective cells, and switching of the plurality of communication apparatuses is carried out based on information from terminals or the like (e.g., Patent Literatures 1 and 2).

CITATION LIST

Patent Literature

[Patent Literature 1]
Japanese Patent Application Publication Tokukai No. 2019-29842
[Patent Literature 2]
Japanese Patent Application Publication Tokukai No. 2020-17815

SUMMARY OF INVENTION

Technical Problem

In a wireless communication system disclosed in Patent Literature 1, when switching a plurality of communication apparatuses, a connection is made to any one of communication sections based on traffic volumes of the respective plurality of communication apparatuses. Therefore, there has been a problem that it is impossible to cope with interference due to overlap between cells and bandwidth limitation.

In a relay apparatus disclosed in Patent Literature 2, attention is paid to replacement of the relay apparatus in accordance with distribution/synthesis of signals between a wireless control apparatus and a wireless apparatus and functional partitioning. Therefore, there has been a problem that no consideration is given to interference due to overlap between cells and bandwidth limitation.

An example aspect of the present invention is accomplished in view of the above problems, and an example object thereof is to provide a control technique of optimizing bandwidth limitation while avoiding interference due to overlap between cells.

Solution to Problem

A wireless communication control apparatus in accordance with an example aspect of the present invention is a wireless communication control apparatus for controlling a wireless communication system which includes a plurality of wireless slave stations and a base station connected to the plurality of wireless slave stations, communication areas of the plurality of wireless slave stations including an overlapping region where communication areas of wireless slave stations overlap each other, the wireless communication control apparatus including at least one processor, the at least one processor carrying out: an information acquisition process of acquiring information pertaining to a terminal which is connected to the wireless communication system; and a switching control process of carrying out switching, based on the information pertaining to the terminal, between whether the base station causes the plurality of wireless slave stations to function respectively as a plurality of separate cells or the base station causes the plurality of wireless slave stations to function as a single cell.

A wireless communication control method in accordance with an example aspect of the present invention is a wireless communication control method for controlling a wireless communication system which includes a plurality of wireless slave stations and a base station connected to the plurality of wireless slave stations, communication areas of the plurality of wireless slave stations including an overlapping region where communication areas of wireless slave stations overlap each other, the wireless communication control method including: acquiring information pertaining to a terminal which is connected to the wireless communication system; and switching, based on the information pertaining to the terminal, between whether the base station causes the plurality of wireless slave stations to function respectively as a plurality of separate cells or the base station causes the plurality of wireless slave stations to function as a single cell.

A non-transitory storage medium in accordance with an example aspect of the present invention stores a program for causing a computer to function as a wireless communication control apparatus for controlling a wireless communication system which includes a plurality of wireless slave stations and a base station connected to the plurality of wireless slave stations, communication areas of the plurality of wireless slave stations including an overlapping region where communication areas of wireless slave stations overlap each other, the program causing the computer to carry out: an information acquisition process of acquiring information pertaining to a terminal which is connected to the wireless communication system; and a switching control process of carrying out switching, based on the information pertaining to the terminal, between whether the base station causes the plurality of wireless slave stations to function respectively as a plurality of separate cells or the base station causes the plurality of wireless slave stations to function as a single cell.

Advantageous Effects of Invention

According to an example aspect of the present invention, it is possible to optimize bandwidth limitation while appropriately avoiding interference due to overlap between cells.

EXAMPLE EMBODIMENTS

First Example Embodiment

The following description will discuss a first example embodiment of the present invention in detail, with reference to the drawings. The present example embodiment is a basic form of example embodiments described later.

(Configurations of Wireless Communication System and Wireless Communication Control Apparatus)

Figure 1:
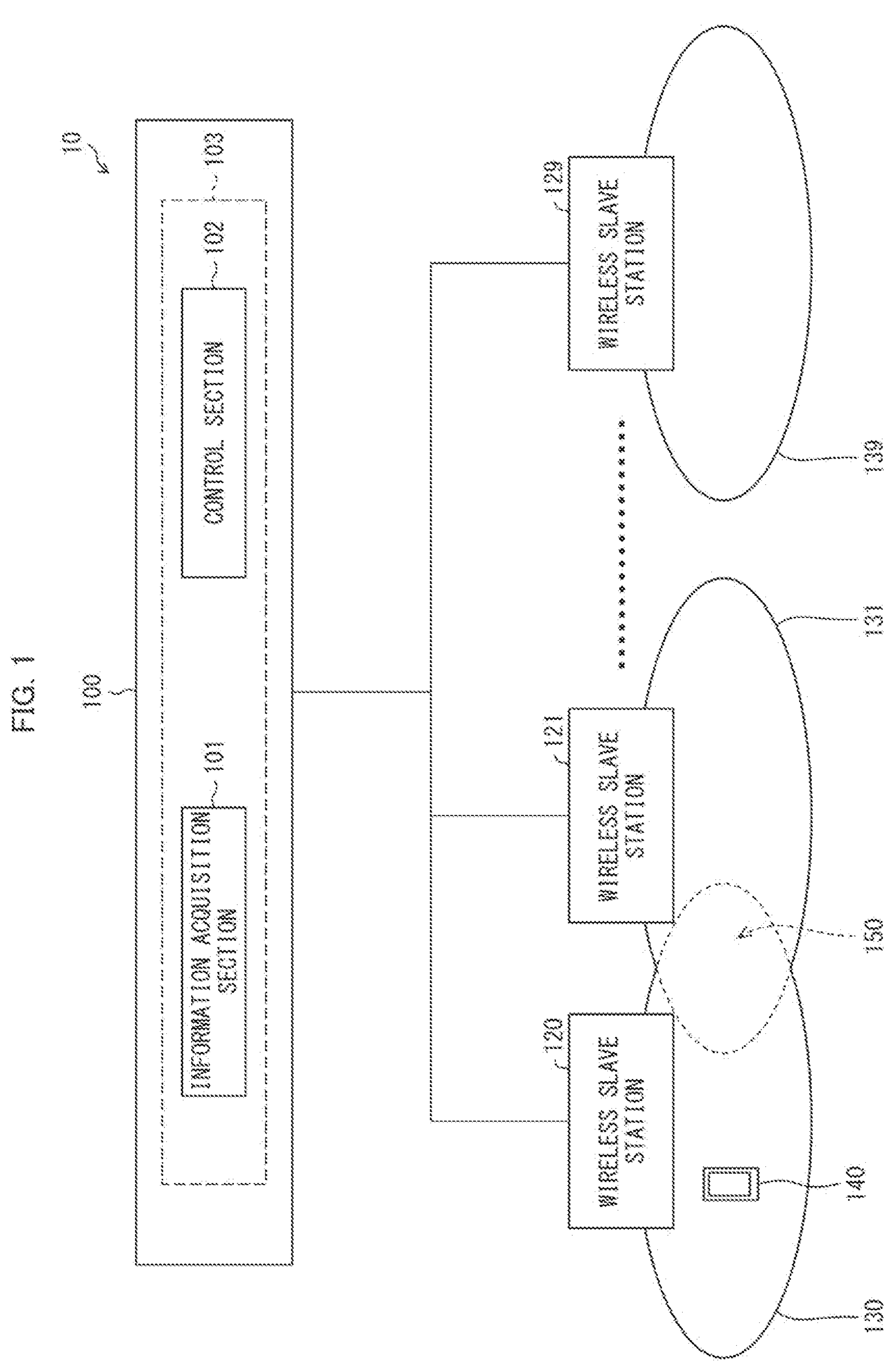
FIG. 1 is a block diagram illustrating a configuration of a wireless communication system in which separate cells are formed in accordance with a first example embodiment of the present invention.

The following description will discuss configurations of a wireless communication system 10 and a wireless communication control apparatus 103 in accordance with the present example embodiment, with reference to FIG. 1. FIG. 1 is a block diagram illustrating a configuration of the wireless communication system 10 in which separate cells are formed. The wireless communication system 10 in accordance with the first example embodiment can be, for example, a wireless communication line of local 5th generation (5G).

The wireless communication system 10 includes a base station 100 and a plurality of wireless slave stations 120 through 129. The base station 100 includes a wireless communication control apparatus 103 for controlling the wireless communication system 10. In the present example embodiment, the wireless communication control apparatus 103 is provided in the base station 100. Note, however, that the wireless communication control apparatus 103 may be provided as an independent apparatus that is separated from the base station 100. The wireless communication control apparatus 103 includes an information acquisition section 101 which acquires information pertaining to a terminal, and a control section 102.

The plurality of wireless slave stations 120 through 129 are connected to the base station 100. The wireless slave station 120 forms a cell 130 in a communication area of the wireless slave station 120. Similarly, the wireless slave stations 121 through 129 form cells 131 through 139 in respective communication areas of the wireless slave stations 121 through 129. Note that a communication area of a wireless slave station refers to a positional range of a terminal which can communicate with the wireless slave station. The wireless slave stations 120 through 129 in FIG. 1 are controlled to form cells 130 through 139, respectively, which are independent of each other. Here, the communication areas of the wireless slave stations 120 through 129 include an overlapping region where communication areas of adjacent communication areas overlap each other. Accordingly, the cells 130 through 139 also include an overlapping area where regions of cells overlap each other. For example, as illustrated in FIG. 1, an overlapping region 150 is formed between the cell 130 and the cell 131.

Within a range of the cell 130, a plurality of terminals 140 are positioned. The terminals 140 are connected to the base station 100 and the wireless communication control apparatus 103 via the wireless slave station 120. The information acquisition section 101 of the wireless communication control apparatus 103 acquires pieces of information pertaining to the terminals 140.

The control section 102 of the wireless communication control apparatus 103 receives terminal information from the information acquisition section 101. The control section 102 switches, based on the received terminal information, between whether to cause the wireless slave stations 120 through 129 to function to respectively form a plurality of separate cells or to cause the wireless slave stations 120 through 129 to function to form a single cell. In FIG. 1, the control section 102 causes the wireless slave stations 120 through 129 to function to form the separate cells 130 through 139, respectively.

Figure 2:
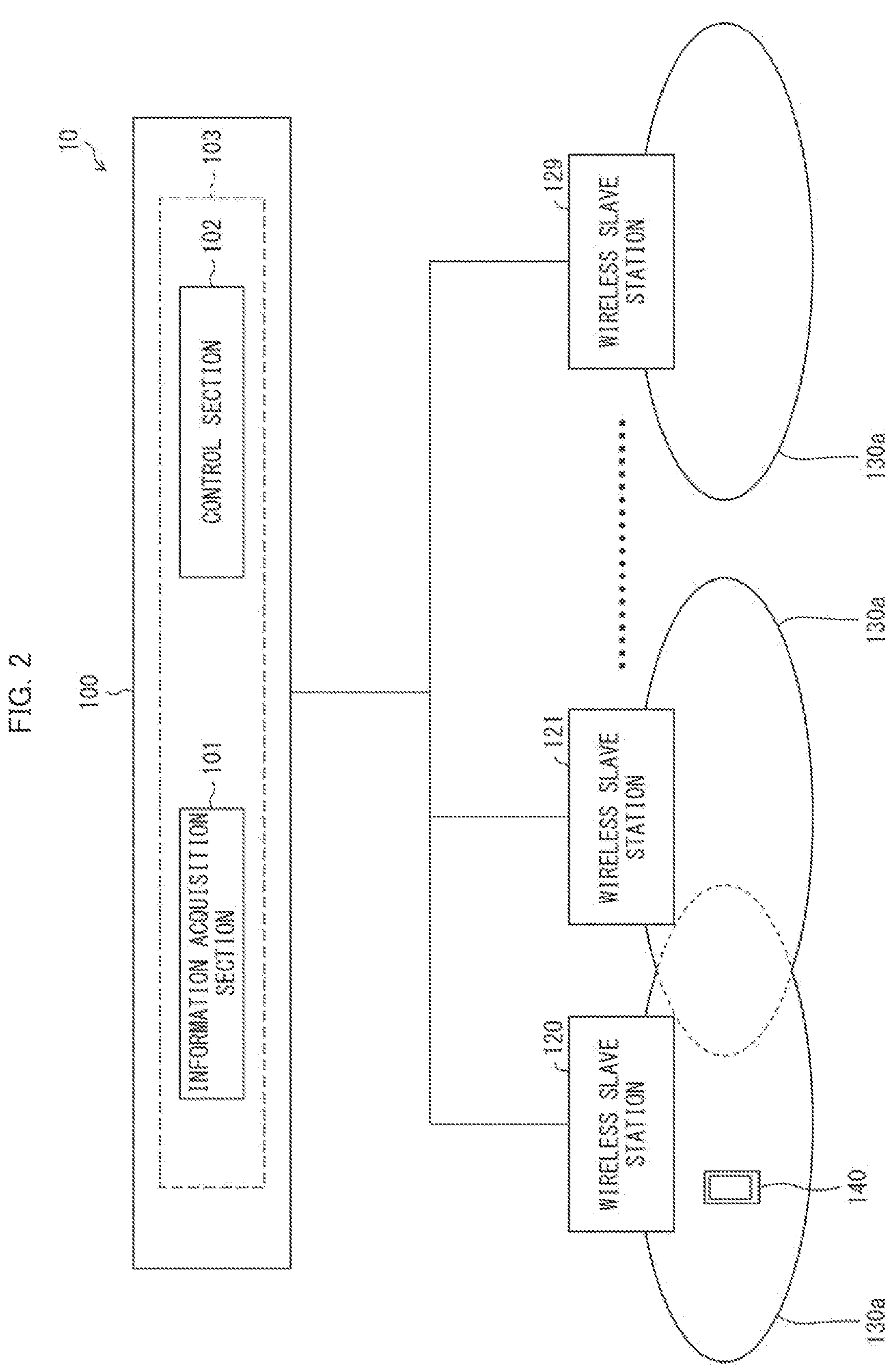
FIG. 2 is a block diagram illustrating a configuration of the wireless communication system in which a single cell is formed in accordance with the first example embodiment of the present invention.

The following description will discuss a case in which a single cell is formed in the present example embodiment. FIG. 2 is a block diagram illustrating a configuration of the wireless communication system 10 in which a single cell is formed. In FIG. 2, portions identical with those in FIG. 1 are given the same reference signs, and descriptions of such portions are omitted. In FIG. 2, the control section 102 causes the wireless slave stations 120 through 129 to function to form a single cell 130*a*. That is, the single cell 130*a* does not include an overlapping region.

For the single cell 130*a*, a frequency band is allocated as a whole. In a case where a specific frequency band (e.g., 100 MHz) is allocated to the cell 130*a* as a whole, frequency bands which can be allocated to terminals connected to the cell 130*a* are reduced, as compared with a case where separate cells are formed.

In the first example embodiment of the present invention, the control section 102 switches, based on pieces of information from terminals 140, between whether to cause the wireless slave stations 120 through 129 to function to form the separate cells 130 through 139, respectively, as illustrated in FIG. 1 or to cause the wireless slave stations 120 through 129 to function to form the single communication area 130*a* as illustrated in FIG. 2.

(Flow of Wireless Communication Control Method)

Figure 3:
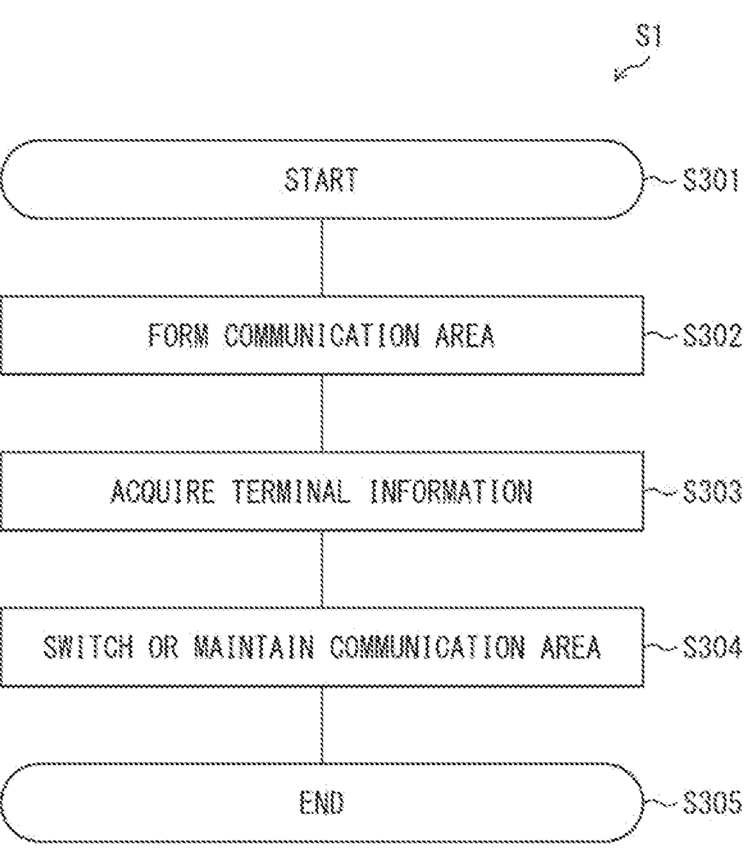
FIG. 3 is a flowchart illustrating a flow of a wireless communication control method in accordance with the first example embodiment of the present invention.

The following description will discuss a flow of a wireless communication control method S1 in accordance with the present example embodiment, with reference to FIG. 3. FIG. 3 is a flowchart illustrating the flow of the wireless communication control method S1.

First, the wireless communication control method starts in step S301. Next, a cell is formed in step S302. The cell is formed by the plurality of wireless slave stations 120 through 129. The cell formed here is (i) a plurality of separate cells 130 through 139 or (ii) a single cell 130*a*. In a case where the plurality of separate cells 130 through 139 are formed, an overlapping region (e.g., the overlapping region 150) is formed where cells overlap each other.

Next, in step S303, terminal information is acquired. In this step S303, the information acquisition section 101 acquires information of a terminal 140 which is positioned in the separate cells 130 through 139 or in the single cell 130*a*. The terminal 140 is mobile, and therefore positional information of the terminal changes over time.

Next, in step S304, cell switching or cell maintenance is carried out. In this step S304, in a case where separate cells are formed, whether to switch the separate cells to a single cell or to maintain the separate cells is decided based on the information of the terminal 140.

In step S304, in a case where a single cell is formed, whether to maintain the single cell or to switch the single cell to separate cells is decided based on the information of the terminal 140.

After the cell switching or cell maintenance is carried out in step S304, the wireless communication control method ends (step S305).

As such, the wireless communication control apparatus 103 in accordance with the present example embodiment employs the configuration in which whether to form a single cell or separate cells is decided based on terminal information. Therefore, according to the wireless communication control apparatus 103 in accordance with the present example embodiment, it is possible to bring about an example advantage of securing a cell to which an optimum band is allocated.

Second Example Embodiment

The following description will discuss a second example embodiment of the present invention in detail with reference to the drawings. The present example embodiment is a basic form of example embodiments described later.

(Configurations of Wireless Communication System and Wireless Communication Control Apparatus)

Figure 4:
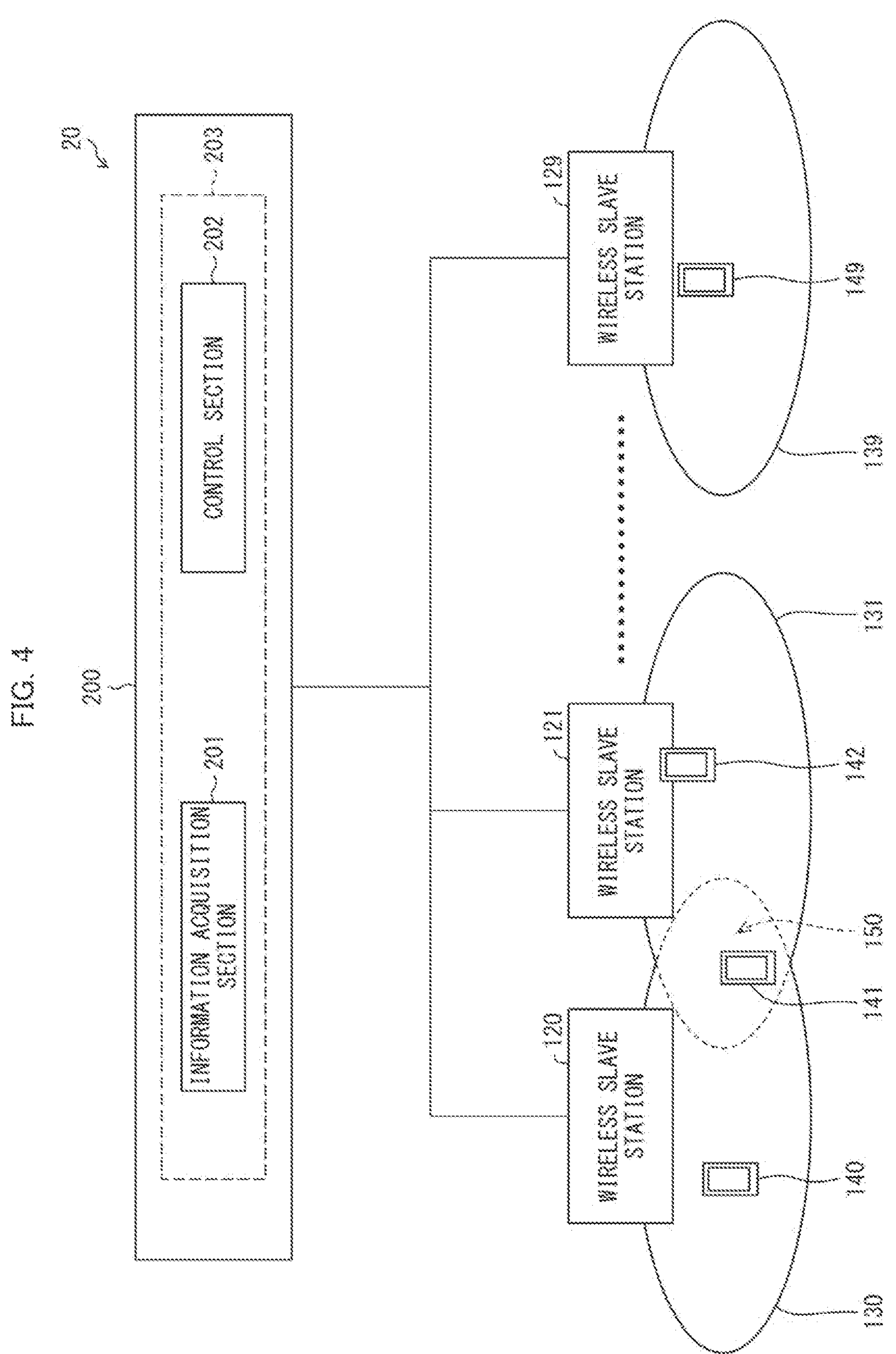
FIG. 4 is a block diagram illustrating a configuration of a wireless communication system in which separate cells are formed in accordance with a second example embodiment of the present invention.

The following description will discuss configurations of a wireless communication system 20 and a wireless communication control apparatus 203 in accordance with the present example embodiment, with reference to FIG. 4. FIG. 4 is a block diagram illustrating a configuration of the wireless communication system 20 in which separate cells are formed. The wireless communication system 20 in accordance with the second example embodiment can be, for example, a wireless communication line of local 5th generation (5G).

The wireless communication system 20 includes a base station 200 and a plurality of wireless slave stations 120 through 129. The base station 200 includes a wireless communication control apparatus 203 for controlling the wireless communication system 20. In the present example embodiment, the wireless communication control apparatus 203 is provided in the base station 200. Note, however, that the wireless communication control apparatus 203 may be provided as an independent apparatus that is separated from the base station 200. The wireless communication control apparatus 203 includes an information acquisition section 201 which acquires information pertaining to a terminal, and a control section 202.

The plurality of wireless slave stations 120 through 129 are connected to the base station 200. The features in which the wireless slave stations 120 through 129 are controlled to form separate cells 130 through 139 and an overlapping region 150 is formed are identical with those in the first example embodiment.

Within a range of the cells 130 through 139, a plurality of terminals 140, 141, 142, and 149 are positioned. The terminals 140, 141, 142, and 149 are connected to the base station 200 and the wireless communication control apparatus 203 via the wireless slave stations 120, 121, and 129. The information acquisition section 201 of the wireless communication control apparatus 203 acquires pieces of positional information of the terminals 140, 141, 142, and 149. Note that the terminals 140, 141, 142, and 149 are mobile, and therefore pieces of positional information of the terminals change over time.

The control section 202 of the wireless communication control apparatus 203 receives the pieces of positional information of the terminals from the information acquisition section 201. The control section 202 switches, based on the received pieces of positional information of the terminals, between whether to cause the wireless slave stations 120 through 129 to function to form a plurality of separate cells or to cause the wireless slave stations 120 through 129 to function to form a single cell. In FIG. 4, the control section 202 causes the wireless slave stations 120 through 129 to function to form separate cells 130 through 139, respectively.

As described in the first example embodiment, the overlapping region 150 is formed at peripheral portions (cell edges) of cells adjacent to each other, and is included in both the cells. Therefore, cell edge interference occurs. Accordingly, the terminal 141 is affected by cell edge interference. Meanwhile, frequency bands are allocated to the separate cells 130 through 139, respectively. In a case where a specific frequency band (e.g., 100 MHz) is allocated to each of the cells 130 through 139, frequency bands (or the number of channels) which can be allocated to terminals connected to the separate cells 130 through 139 are increased, as compared with a case where a single cell 130*a* is formed.

Figure 5:
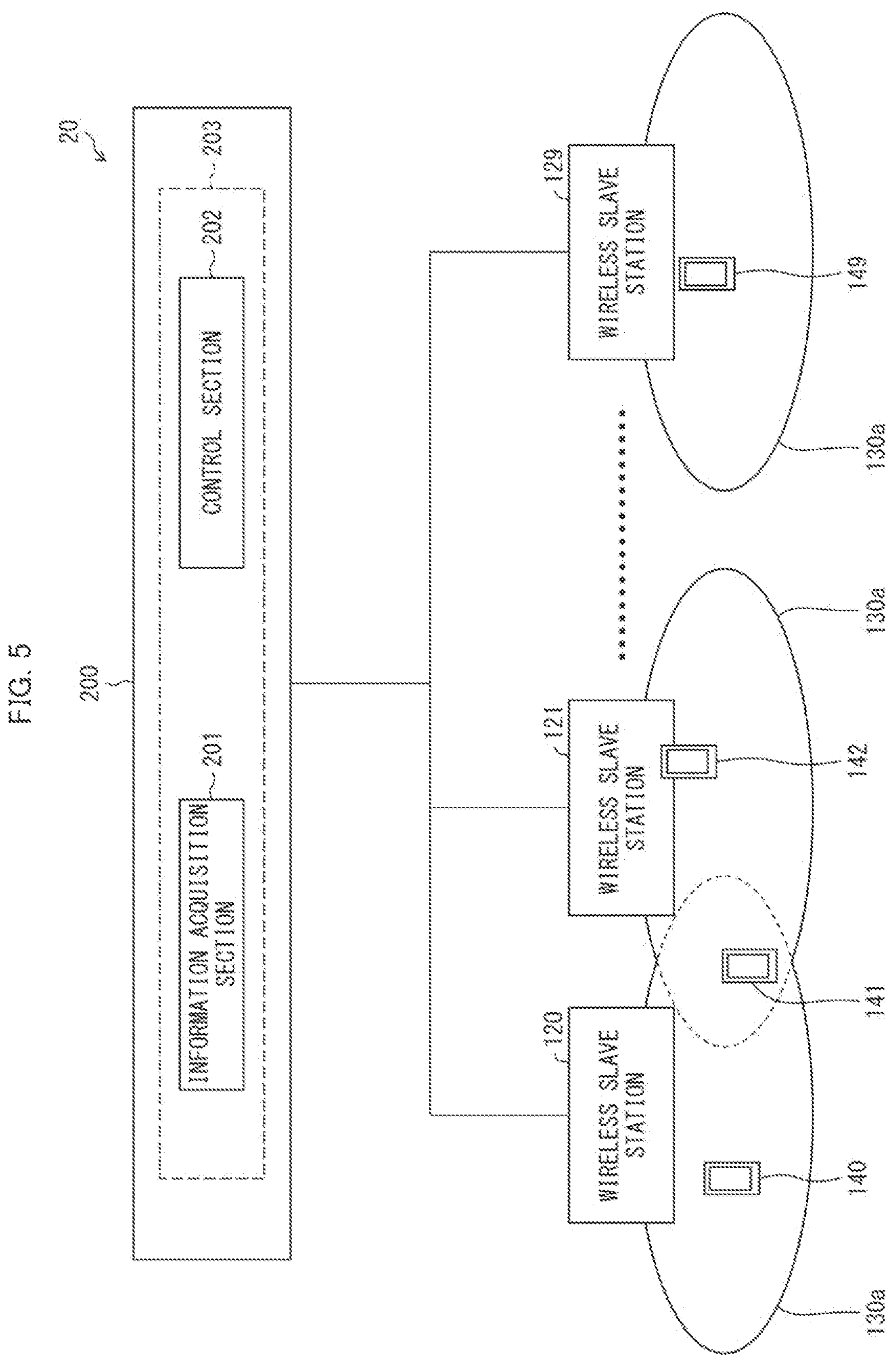
FIG. 5 is a block diagram illustrating a configuration of the wireless communication system in which a single cell is formed in accordance with the second example embodiment of the present invention.

The following description will discuss a case in which a single cell is formed in the present example embodiment. FIG. 5 is a block diagram illustrating a configuration of the wireless communication system 20 in which a single cell is formed. In FIG. 5, portions identical with those in FIG. 4 are given the same reference signs, and descriptions of such portions are omitted. In FIG. 5, the control section 202 causes the wireless slave stations 120 through 129 to function to form a single cell 130*a*. That is, the single cell 130*a* does not include an overlapping region.

The terminals 140, 141, 142, and 149 positioned in the single cell 130*a* are not affected by cell edge interference. Meanwhile, a frequency band is allocated to the single cell 130*a* as a whole. In a case where a specific frequency band (e.g., 100 MHz) is allocated to the cell 130*a* as a whole, frequency bands (or the number of channels) which can be allocated to terminals connected to the cell 130*a* are reduced, as compared with a case where separate cells are formed.

In the second example embodiment of the present invention, the control section 202 switches, based on pieces of positional information from the terminals 140, 141, 142, and 149, between whether to cause the wireless slave stations 120 through 129 to function to form the separate cells 130 through 139, respectively, as illustrated in FIG. 4 or to cause the wireless slave stations 120 through 129 to function to form the single cell 130*a* as illustrated in FIG. 5.

Specifically, in a case where separate cells are formed and the information acquisition section 201 has acquired positional information indicating that the terminal 141 is positioned in the overlapping region 150, the control section 202 controls the wireless slave stations 120 through 129 to form a single cell. Meanwhile, in a case where separate cells are formed and the information acquisition section 201 has acquired positional information indicating that no terminal is positioned in the overlapping region 150, the control section 202 controls the wireless slave stations 120 through 129 to maintain the separate cells.

In a case where a single cell is formed and the information acquisition section 201 has acquired positional information indicating that the terminal 141 is positioned in a virtual overlapping region, which corresponds to the overlapping region 150 existing when the separate cells are formed, the control section 202 controls the wireless slave stations 120 through 129 to maintain the single cell. Meanwhile, in a case where the information acquisition section 201 has acquired information indicating that no terminal is positioned in the foregoing virtual overlapping region, the control section 202 controls the wireless slave stations 120 through 129 to form separate cells.

As described above, the wireless communication control apparatus 203 in accordance with the present example embodiment employs the configuration in which, in a case where a terminal is positioned in the overlapping region 150 (or the virtual overlapping region), a single cell is formed, and in a case where no terminal is positioned in the overlapping region 150 (or the virtual overlapping region), separate cells are formed. Therefore, according to the wireless communication control apparatus 203 in accordance with the present example embodiment, it is possible to bring about an example advantage of securing a cell to which an optimum band is allocated while preventing cell edge interference.

Third Example Embodiment

The following description will discuss in detail a third example embodiment of the present invention, with reference to drawings. The same reference numerals are given to constituent elements which have functions identical with those described in the second example embodiment, and descriptions as to such constituent elements are omitted as appropriate.

Figure 6:
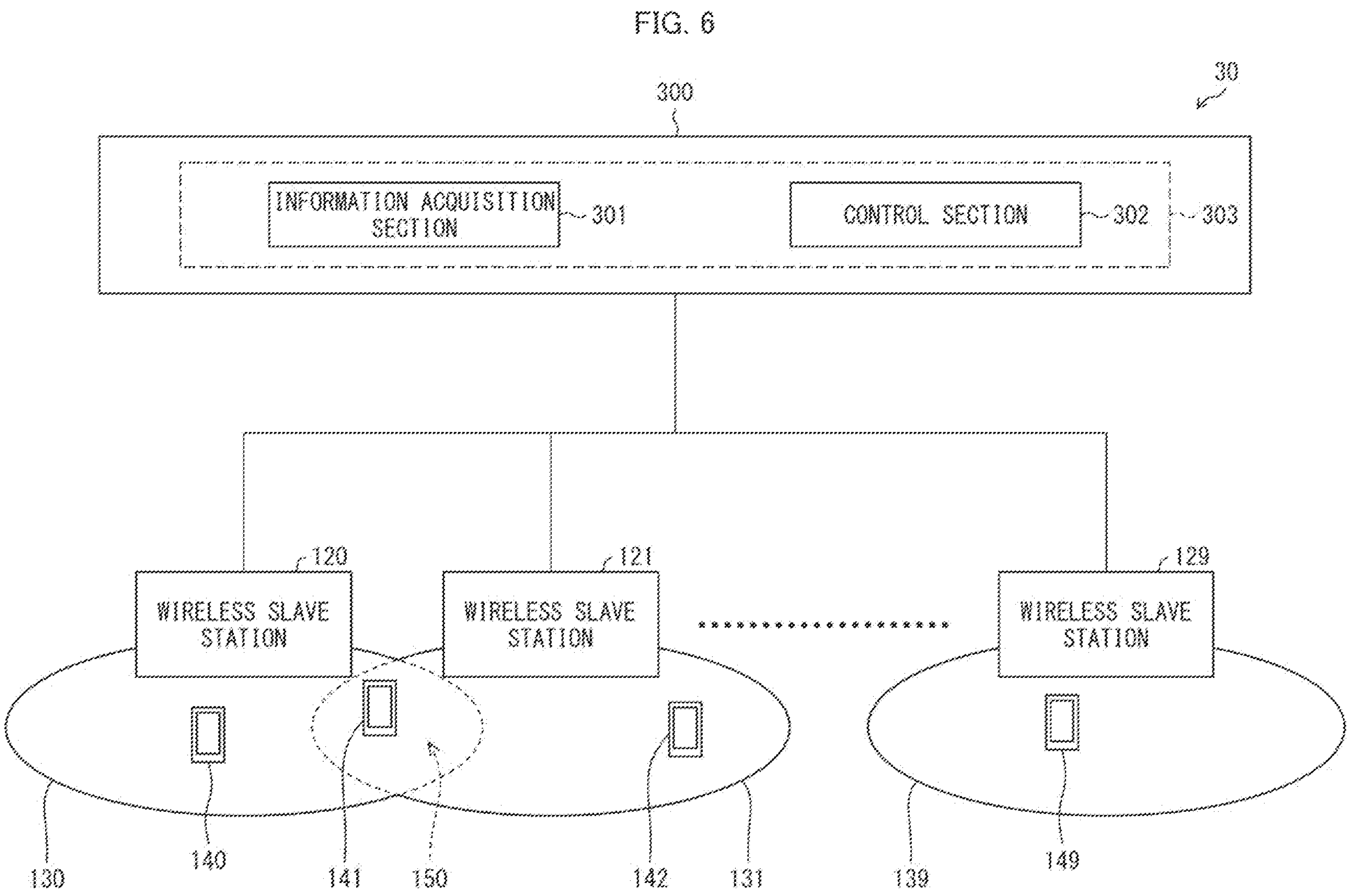
FIG. 6 is a block diagram illustrating a configuration of a wireless communication system in which separate cells are formed in accordance with a third example embodiment of the present invention.

FIG. 6 is a block diagram illustrating a configuration of a wireless communication system 30 in accordance with the third example embodiment in which separate cells are formed. The wireless communication system 30 can be, for example, a wireless communication line of local 5G.

The wireless communication system 30 includes a base station 300 and a plurality of wireless slave stations 120 through 129. The base station 300 includes a wireless communication control apparatus 303 for controlling the wireless communication system 30. In the present example embodiment, the wireless communication control apparatus 303 is provided in the base station 300. Note, however, that the wireless communication control apparatus 303 may be provided as an independent apparatus that is separated from the base station 300. The wireless communication control apparatus 303 includes an information acquisition section 301 which acquires information pertaining to a terminal, and a control section 302.

The plurality of wireless slave stations 120 through 129 are connected to the base station 300. The wireless slave stations 120 through 129, the cells 130 through 139 and 130*a*, the overlapping region 150, and the terminals 140 through 149 are similar to those in the first example embodiment. Therefore, descriptions thereof will be omitted.

The information acquisition section 301 of the wireless communication control apparatus 303 acquires, as pieces of information of the terminals 140, 141, 142, and 149, the number of terminals 141 positioned in the overlapping region 150. In FIG. 6, the number of terminals in the overlapping region 150 is one. The control section 302 of the wireless communication control apparatus 303 receives, from the information acquisition section 301, information indicating the number of terminals in the overlapping region.

The control section 302 switches, based on the received terminal information (the number of terminals), between whether to cause the wireless slave stations 120 through 129 to function to form a plurality of separate cells or to cause the wireless slave stations 120 through 129 to function to form a single cell. In FIG. 6, the control section 302 causes the wireless slave stations 120 through 129 to function to form the separate cells 130 through 139, respectively.

Figure 7:
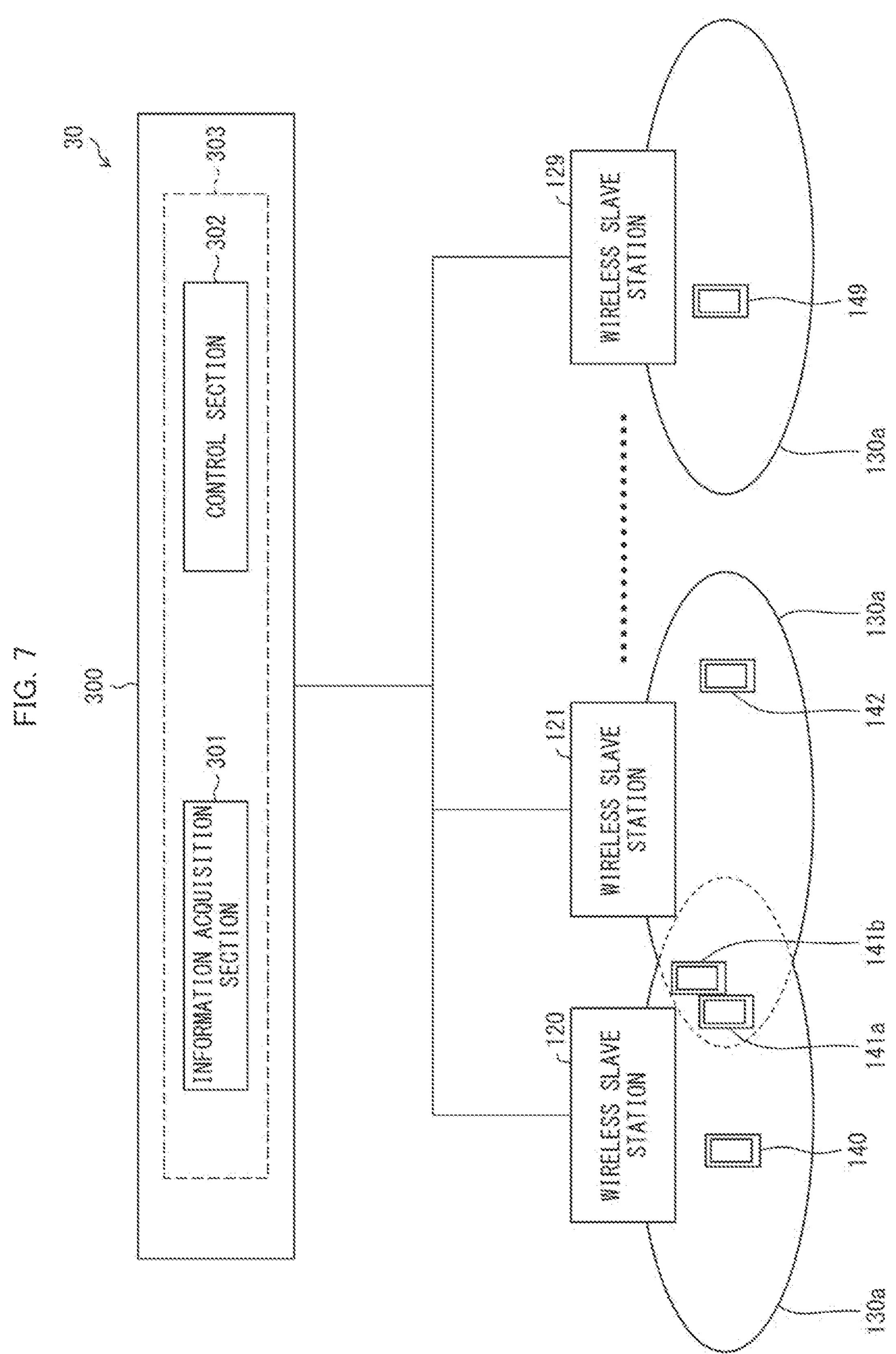
FIG. 7 is a block diagram illustrating a configuration of the wireless communication system in which a single cell is formed in accordance with the third example embodiment of the present invention.

The following description will discuss a case in which a single cell is formed in the present example embodiment. FIG. 7 is a block diagram illustrating a configuration of the wireless communication system 30 in which a single cell is formed. In FIG. 7, portions identical with those in FIG. 6 are given the same reference signs, and descriptions of such portions are omitted. In FIG. 7, the control section 302 causes the wireless slave stations 120 through 129 to function to form a single cell 130*a*. The single cell 130*a* does not include an overlapping region. However, there is a virtual overlapping region, which corresponds to the overlapping region 150 existing when separate cells are formed.

In FIG. 7, two terminals 141*a* and 141*b* are positioned in the virtual overlapping region. Accordingly, the information acquisition section 301 acquires information indicating "two" as information (number) of terminals.

In the third example embodiment of the present invention, in a case where separate cells are formed and the information acquisition section 301 has acquired information indicating that two or more terminals are positioned in the overlapping region 150, the control section 302 controls the wireless slave stations 120 through 129 to form a single cell. Meanwhile, in a case where separate cells are formed and the information acquisition section 301 has acquired information indicating that not more than one terminal is positioned in the overlapping region 150, the control section 302 controls the wireless slave stations 120 through 129 to maintain the separate communication areas.

In a case where a single cell is formed and the information acquisition section 301 has acquired information indicating that two or more terminals are positioned in a virtual overlapping region, the control section 302 controls the wireless slave stations 120 through 129 to maintain the single cell. Meanwhile, in a case where the information acquisition section 301 has acquired information indicating that not more than one terminal is positioned in the virtual overlapping region, the control section 302 controls the wireless slave stations 120 through 129 to form separate cells.

In the third example embodiment, the control section 302 carries out control so that, (i) in a case where the number of terminals positioned in the overlapping region 150 (or the virtual overlapping region) is 1 or less, separate cells are formed, and (ii) in a case where the number of terminals positioned in the overlapping region 150 (or the virtual overlapping region) is 2 or more, a single cell is formed. The number of terminals (i.e., a branching point of this control) positioned in the overlapping region 150 (or the virtual overlapping region) is based on a trade-off between (i) reduction of cell edge interference and (ii) securing of a cell to which an optimum band is allocated. The number of terminals in the overlapping region (i.e., the branching point) can be changed based on comparison between those effects.

That is, it is possible to set an optimum number of terminals by comparing (i) a viewpoint of a limit to which a terminal may be affected by cell edge interference until the number of terminals positioned in an overlapping region reaches a predetermined number and (ii) a viewpoint that an optimum band is allocated by setting of separate cells.

In the third example embodiment, the information acquisition section 301 of the wireless communication control apparatus 303 may obtain pieces of positional information of the respective terminals 140, 141, 142, and 149 (i.e., pieces of information pertaining to the terminals 140, 141, 142, and 149) and obtain the number of terminals for which handovers occur when switching between a single cell and separate cells is carried out. The number of terminals for which handovers occur varies depending on which cell ID is used. Therefore, it is preferable that the determination is made based on ID of the selected cell. It is possible to employ a configuration in which, when switching between a single cell and separate cells is carried out, the current cell format is maintained without carrying out the switching if the number of terminals for which handovers occur is not less than a predetermined number.

Thus, by carrying out the determination of switching based on the number of terminals for which handovers occur, it is possible to provide communication optimum for the whole.

As described above, the wireless communication control apparatus 303 in accordance with the third example embodiment employs the configuration in which (i) a single cell is formed in a case where the number of terminals positioned in the overlapping region 150 (or the virtual overlapping region) is not less than a predetermined number, and (ii) separate cells are formed in a case where the number of terminals positioned in the overlapping region 150 (or the virtual overlapping region) is less than the predetermined number. Therefore, according to the wireless communication control apparatus 303 in accordance with the present example embodiment, it is possible to bring about an example advantage of securing a cell to which an optimum band is allocated while keeping cell edge interference within bounds.

Fourth Example Embodiment

The following description will discuss a fourth example embodiment of the present invention in detail with reference to the drawings. The same reference numerals are given to constituent elements which have functions identical with those described in the second example embodiment, and descriptions as to such constituent elements are omitted as appropriate.

Figure 8:
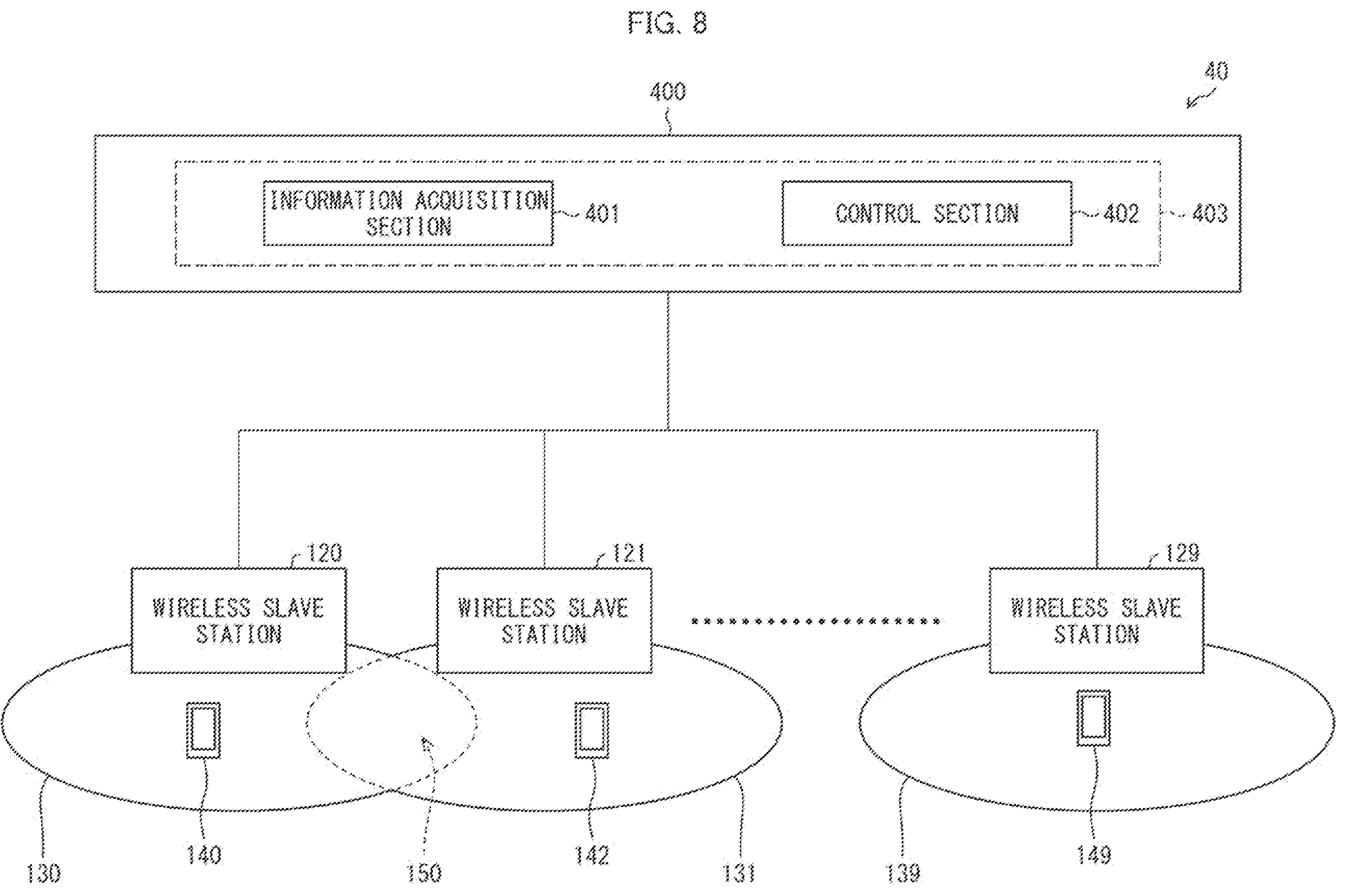
FIG. 8 is a block diagram illustrating a configuration of a wireless communication system in which separate cells are formed in accordance with a fourth example embodiment of the present invention.

FIG. 8 is a block diagram illustrating a configuration of a wireless communication system 40 in accordance with the fourth example embodiment in which separate cells are formed. The wireless communication system 40 can be, for example, a wireless communication line of local 5G.

The wireless communication system 40 includes a base station 400 and a plurality of wireless slave stations 120 through 129. The base station 400 includes a wireless communication control apparatus 403 for controlling the wireless communication system 40. In the present example embodiment, the wireless communication control apparatus 403 is provided in the base station 400. Note, however, that the wireless communication control apparatus 403 may be provided as an independent apparatus that is separated from the base station 400. The wireless communication control apparatus 403 includes an information acquisition section 401 which acquires information pertaining to a terminal, and a control section 402.

The plurality of wireless slave stations 120 through 129 are connected to the base station 400. The wireless slave stations 120 through 129, the communication areas 130 through 139 and **130*a*, the overlapping region 150, and the terminals 140 through 149 are similar to those in the second example embodiment. Therefore, descriptions thereof are omitted. The fourth example embodiment is, however, based on the premise that no terminals are positioned in the overlapping region 150**.

The information acquisition section 401 of the wireless communication control apparatus 403 acquires band request quantities of respective terminals, which are pieces of information of the terminals 140, 142, and 149. In FIG. 8, the terminals 140, 142, and 149 each request a band quantity of 70 MHz. The control section 402 of the wireless communication control apparatus 403 receives, from the information acquisition section 401, pieces of information indicating band quantities requested by the respective terminals.

The control section 402 switches, based on the requested band quantities of the respective terminals which have been received, between whether to cause the wireless slave stations 120 through 129 to function to form a plurality of separate cells or to cause the wireless slave stations 120 through 129 to function to form a single cell. In FIG. 8, in a case where the wireless slave stations 120 through 129 form the respective separate cells 130 through 139, a frequency band allocated to each of the cells 130 through 139 is 100 MHz. Therefore, the band quantity which is requested by each of the terminals does not exceed the frequency band in the case where separate cells are formed. Therefore, is possible to secure it communication of a user. Accordingly, the control section 402 functions such that the wireless slave stations 120 through 129 form (maintain) the separate communication areas 130 through 139, respectively.

The following description will discuss a case in which a single cell is formed in the present example embodiment.

Figure 9:
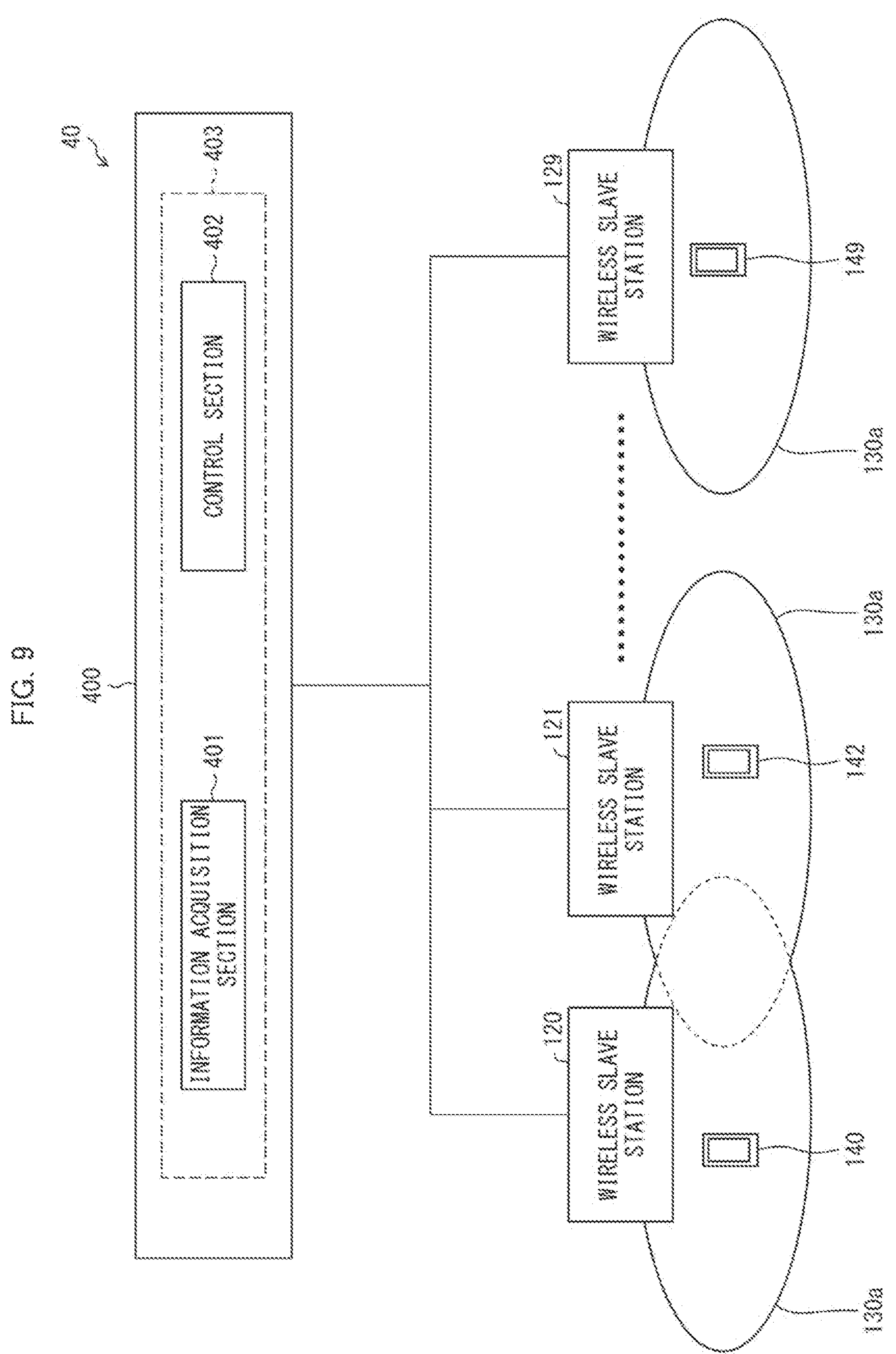
FIG. 9 is a block diagram illustrating a configuration of the wireless communication system in which a single cell is formed in accordance with the fourth example embodiment of the present invention.

FIG. 9 is a block diagram illustrating a configuration of the wireless communication system 40 in which a single cell is formed. In FIG. 9, portions identical with those in FIG. 8 are given the same reference signs, and descriptions of such portions are omitted. In FIG. 9, the control section 402 causes the wireless slave stations 120, 121, and 129 to function to form a single cell 130*a*. A frequency band allocated to the single cell 130*a* is 100 MHz.

In FIG. 9 also, the terminals 140, 142, and 149 each request a band quantity of 70 MHz. The band quantity which the terminals 140, 142, and 149 request in the single cell 130*a* is 210 M in total, which exceeds the allocated band quantity of 100 M.

In the fourth example embodiment of the present invention, the sum of band quantities which are requested by the terminals positioned in the single cell 130*a* exceeds the frequency band allocated to the single cell 130*a*. Therefore, the control section 402 controls the wireless slave stations 120 through 129 to form separate cells by switching the single cell.

In the fourth example embodiment, an example has been described in which switching to separate cells is carried out because the sum of band quantities which are requested by the terminals exceeds the frequency band which is allocated to the single cell. However, in a case where the sum of band quantities which are requested by the terminals does not exceed the frequency band allocated to the single cell, the control section 402 carries out control so that the single cell is maintained. This is necessary to reduce occurrence of handovers due to cell switching.

As described above, the wireless communication control apparatus 403 in accordance with the fourth example embodiment employs the configuration in which the wireless communication control apparatus 403 acquires band quantities which are requested by terminals, and determines, based on the band quantities, whether to form separate cells or to form a single cell. Therefore, according to the wireless communication control apparatus 403 in accordance with the present example embodiment, it is possible to bring about an example advantage of reducing occurrence of handovers and securing a cell to which an optimum band is allocated.

Fifth Example Embodiment

The following description will discuss a fifth example embodiment of the present invention in detail with reference to the drawings. The same reference numerals are given to constituent elements which have functions identical with those described in the second example embodiment, and descriptions as to such constituent elements are omitted as appropriate.

Figure 10:
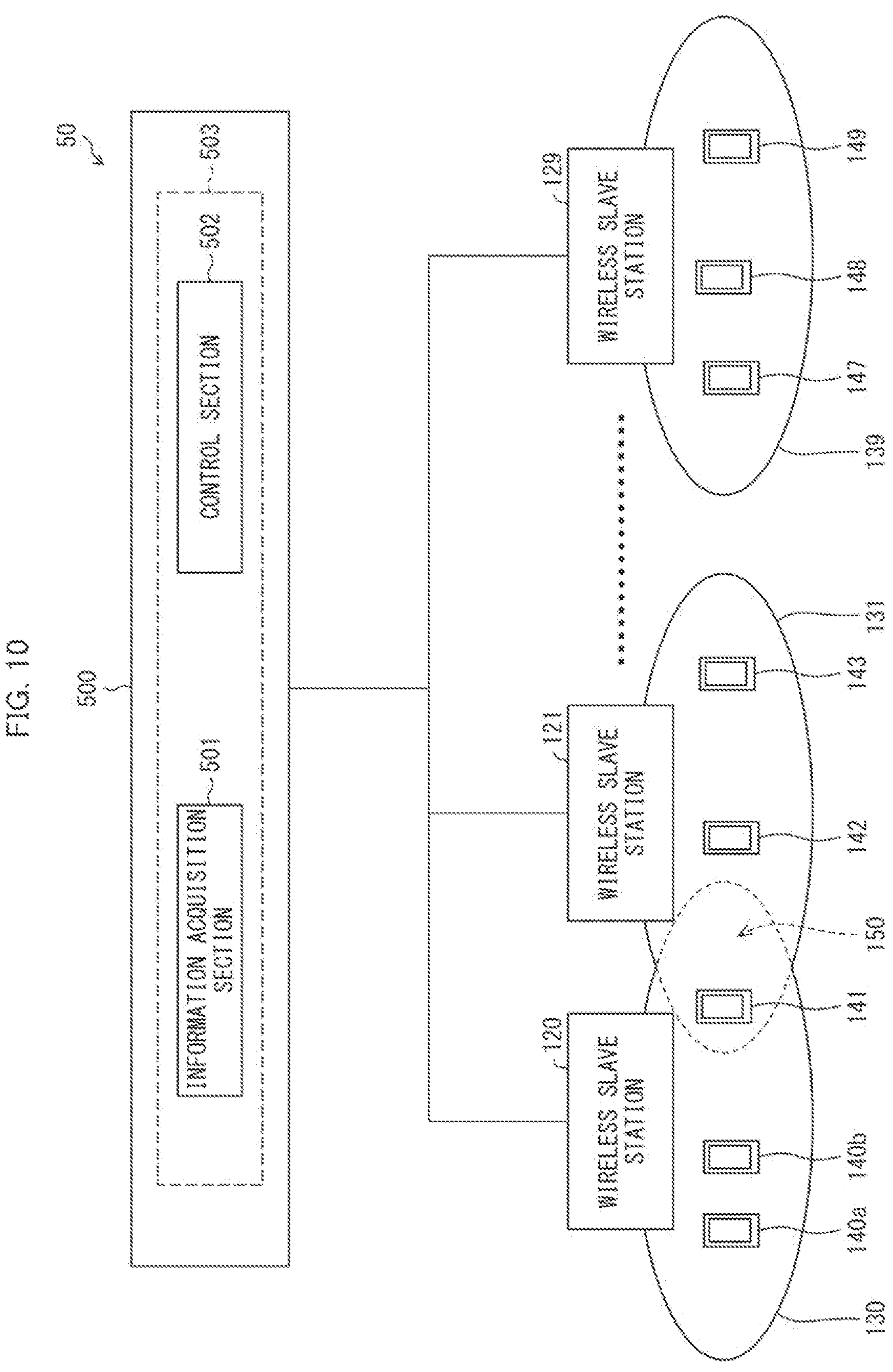
FIG. 10 is a block diagram illustrating a configuration of a wireless communication system in which separate cells are formed in accordance with a fifth example embodiment of the present invention.

FIG. 10 is a block diagram illustrating a configuration of a wireless communication system 50 in accordance with the fifth example embodiment in which separate cells are formed. The wireless communication system 50 can be, for example, a wireless communication line of local 5G.

The wireless communication system 50 includes a base station 500 and a plurality of wireless slave stations 120 through 129. The base station 500 includes a wireless communication control apparatus 503 for controlling the wireless communication system 50. In the present example embodiment, the wireless communication control apparatus 503 is provided in the base station 500. Note, however, that the wireless communication control apparatus 503 may be provided as an independent apparatus that is separated from the base station 500. The wireless communication control apparatus 503 includes an information acquisition section 501 which acquires information pertaining to a terminal, and a control section 502.

The plurality of wireless slave stations 120 through 129 are connected to the base station 500. The wireless slave stations 120 through 129, the communication areas 130 through 139 and 130*a*, the overlapping region 150, and the terminals 140 through 149 are similar to those in the second example embodiment. Therefore, descriptions thereof will be omitted.

The information acquisition section 501 of the wireless communication control apparatus 503 acquires communication speeds (i.e., pieces of information) of the respective terminals 140*a*, 140*b*, 141, 142, 143, 147, 148, and 149. It is highly likely that the terminal 141 positioned in the overlapping region 150 has a lowest communication speed due to cell edge interference. The control section 502 of the wireless communication control apparatus 503 records a lowest communication speed among the communication speeds of the respective terminals which have been received from the information acquisition section 501.

Figure 11:
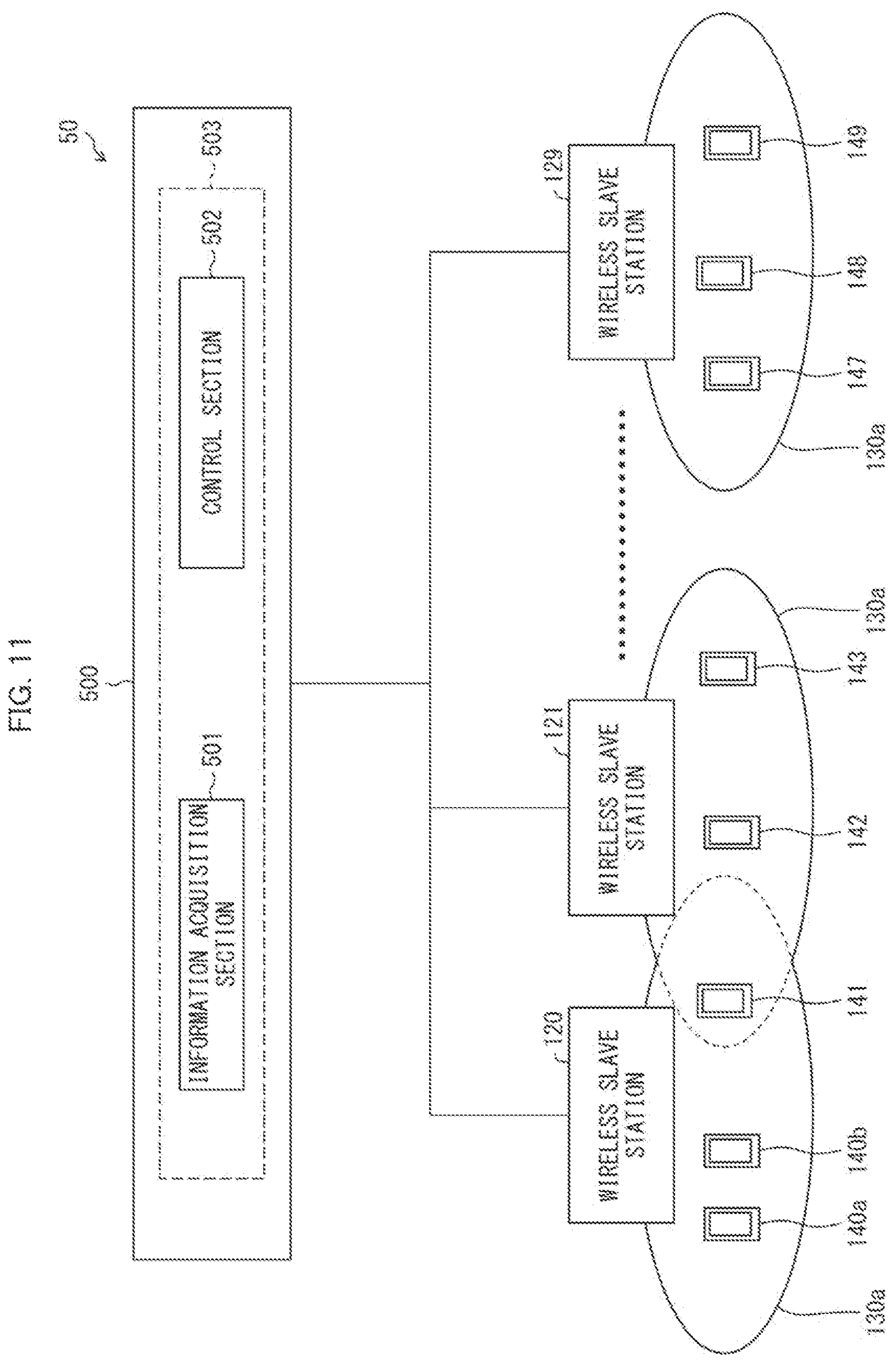
FIG. 11 is a block diagram illustrating a configuration of the wireless communication system in which a single cell is formed in accordance with the fifth example embodiment of the present invention.

The following description will discuss a case in which a single cell is formed in the present example embodiment. FIG. 11 is a block diagram illustrating a configuration of the wireless communication system 50 in which a single cell is formed. In FIG. 11, portions identical with those in FIG. 10 are given the same reference signs, and descriptions of such portions are omitted. In FIG. 11, the information acquisition section 501 of the wireless communication control apparatus 503 acquires communication speeds (i.e., pieces of information) of the respective terminals 140*a*, 140*b*, 141, 142, 143, 144, 147, 148, and 149. The control section 502 of the wireless communication control apparatus 503 records a lowest communication speed among the communication speeds of the respective terminals which have been received from the information acquisition section 501.

After that, the control section 502 of the wireless communication control apparatus 503 compares a lowest communication speed of a terminal in a case where a single cell is formed with a lowest communication speed of a terminal in a case where separate cells are formed. Then, the control section 502 carries out cell maintenance or cell switching so that a cell involving a higher communication speed is selected.

In the present example embodiment, the communication speeds of the respective terminals are measured and compared between the case where separate cells are formed and the case where a single cell is formed. However, in practice, efficiency is improved by comparing an actual measured value in any formed cell with a predicted value in a cell formed after switching. However, if reliability of a predicted value is low, it is preferable to compare actual measured values.

As such, the wireless communication control apparatus 503 in accordance with the fifth example embodiment can avoid a lowest communication speed of a terminal among cases where separate cells are formed and a single cell is formed. Therefore, it is possible to bring about an example advantage of selecting optimum cell formation.

Sixth Example Embodiment

The following description will discuss a sixth example embodiment of the present invention in detail with reference to the drawings. The same reference numerals are given to constituent elements which have functions identical with those described in the second example embodiment, and descriptions as to such constituent elements are omitted as appropriate.

Figure 12:
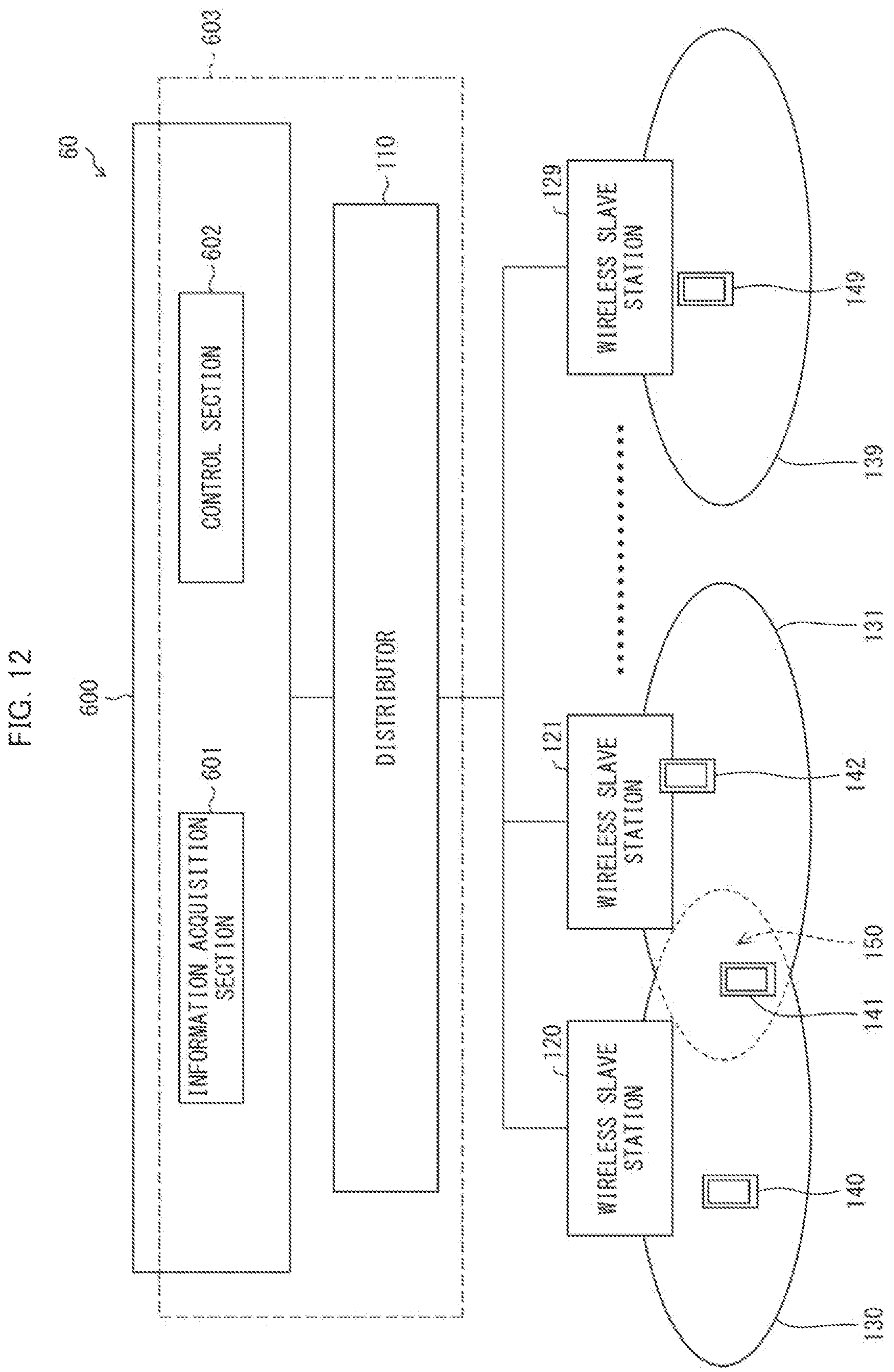
FIG. 12 is a block diagram illustrating a configuration of a wireless communication system in which separate cells are formed in accordance with a sixth example embodiment of the present invention.

FIG. 12 is a block diagram illustrating a configuration of a wireless communication system 60 in accordance with the sixth example embodiment in which separate cells are formed. The wireless communication system 60 can be, for example, a wireless communication line of local 5G.

The wireless communication system 60 includes a base station 600, a distributor 110, and a plurality of wireless slave stations 120 through 129. The base station 600 includes an information acquisition section 601 which acquires information pertaining to a terminal, and a control section 602. In the present example embodiment, the information acquisition section 601 and the control section 602 are provided in the base station 600. Note, however, that the information acquisition section 601 and the control section 602 can be provided separately from the base station 600.

In the sixth example embodiment, the information acquisition section 601, the control section 602, and the distributor 110 constitute the wireless communication control apparatus 603. However, the distributor 110 can be configured to be separated from the wireless communication control apparatus 603.

The plurality of wireless slave stations 120, 121, and 129 are connected to the base station 600 via the distributor 110. The wireless slave stations 120 through 129, the cells 130 through 139 and 130$a$, the overlapping region 150, and the terminals 140 through 149 are similar to those in the second example embodiment. Therefore, descriptions thereof will be omitted.

The information acquisition section 601 of the wireless communication control apparatus 603 acquires pieces of information pertaining to the terminals 140, 141, 142, and 149 via the distributor 110. The control section 602 gives an instruction to control the distributor 110 based on the received pieces of terminal information. The distributor 110 switches, based on an instruction from the control section 602, between whether to cause the wireless slave stations 120 through 129 to function to form a plurality of separate cells or to cause the wireless slave stations 120 through 129 to function to form a single cell.

Figure 13:
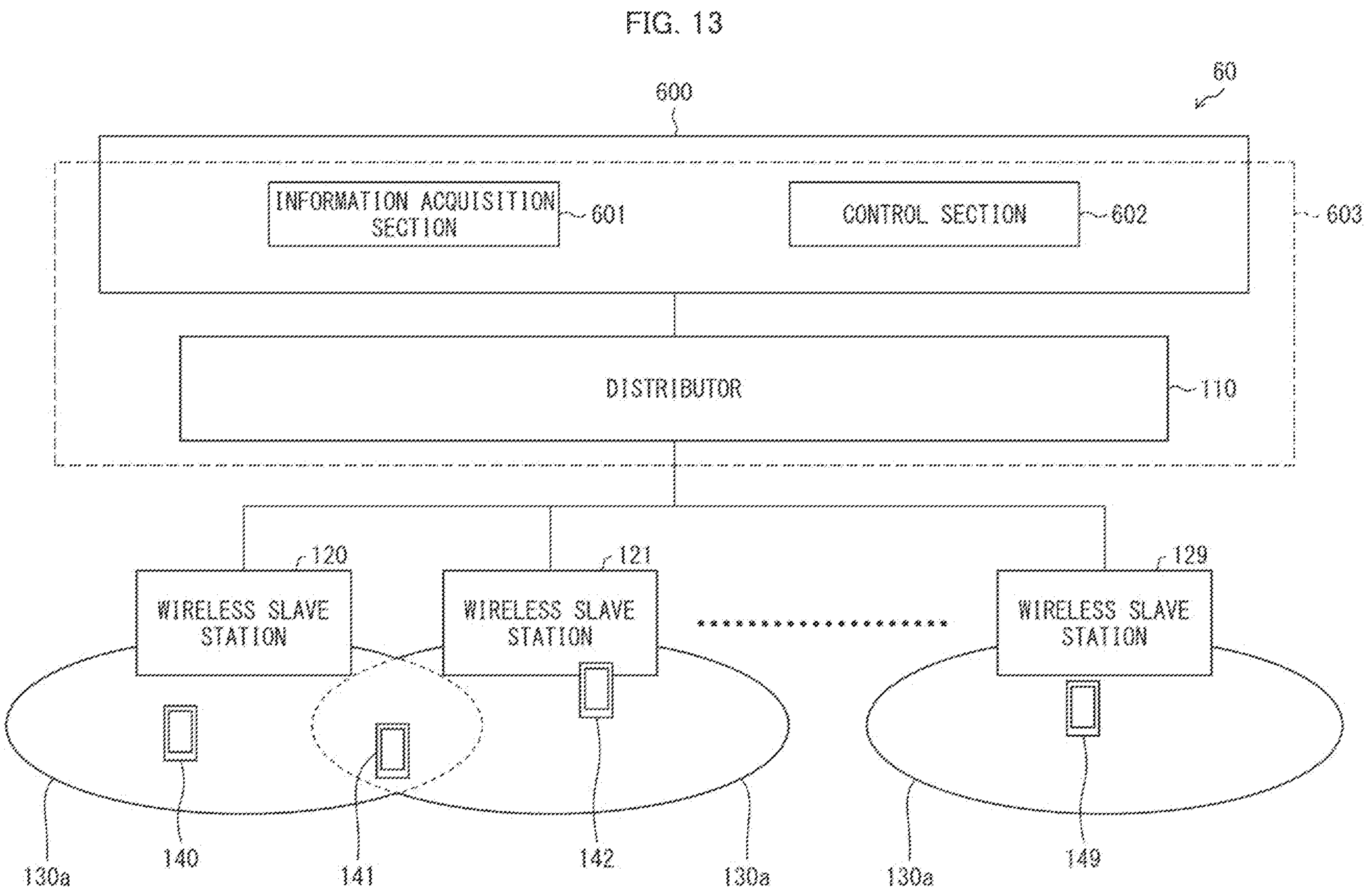
FIG. 13 is a block diagram illustrating a configuration of the wireless communication system in which a single cell is formed in accordance with the sixth example embodiment of the present invention.

The following description will discuss a case in which a single cell is formed in the present example embodiment. FIG. 13 is a block diagram illustrating a configuration of the wireless communication system 60 in which a single cell is formed. In FIG. 13, portions identical with those in FIG. 12 are given the same reference signs, and descriptions of such portions are omitted.

In the sixth example embodiment of the present invention, the control section 602 provides an instruction to the distributor 110 for controlling cell formation. The distributor 110 carries out switching in accordance with this instruction so that the wireless slave stations 120 through 129 form a single cell 130$a$.

In the present example embodiment, in both the case where separate cells are formed and the case where a single cell is formed, the distributor 110 carries out switching in accordance with an instruction from the control section 602. Note that this switching is carried out based on pieces of information pertaining to terminals, as with the first example embodiment. Therefore, a description of such switching is omitted. The distributor 110 can be a front haul multiplexer (FHM) which multiplexes front haul lines. For example, the FHM copies a downstream signal for each cell, and distributes the copied signals to the plurality of wireless slave stations 120, 121, and 129. In addition, for example, the FHM combines upstream signals from the plurality of wireless slave stations transmits the combined signal to the base station 600.

As described above, the wireless communication control apparatus 603 in accordance with the sixth example embodiment can switch the wireless slave stations 120, 121, and 129 by the distributor 110. Therefore, it is possible to bring about an example advantage of carrying out signal processing at high speed.

Software Implementation Example

The functions of part of or all of the wireless communication system and the wireless communication control apparatus can be realized by hardware such as an integrated circuit (IC chip) or can be alternatively realized by software.

Figure 14:
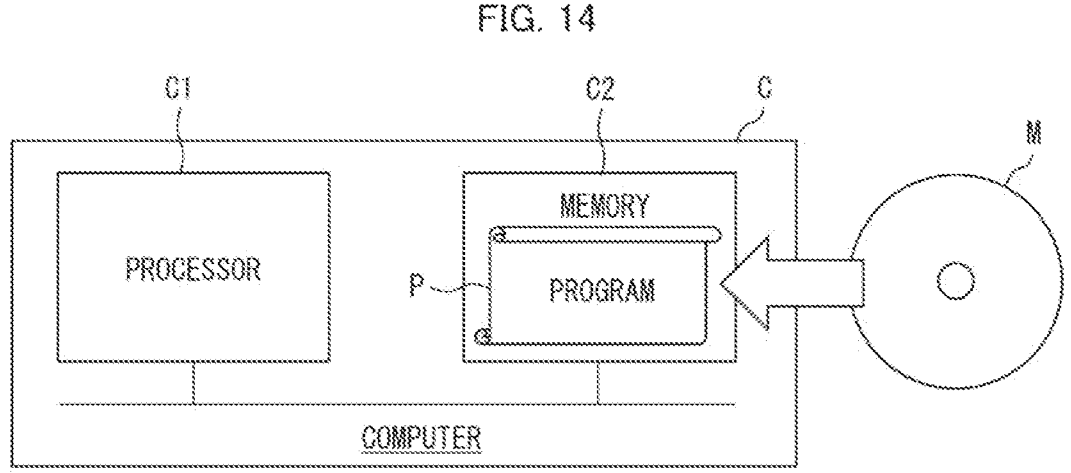
FIG. 14 is a diagram illustrating a software implementation example of the present invention.

In the latter case, the wireless communication system and the wireless communication control apparatus are each realized by, for example, a computer that executes instructions of a program that is software realizing the foregoing functions. An example (hereinafter, computer C) of such a computer is illustrated in FIG. 14. The computer C includes at least one processor C1 and at least one memory C2. The memory C2 stores a program P for causing the computer C to function as each of the wireless communication system and the wireless communication control apparatus. In the computer C, the processor C1 reads the program P from the memory C2 and executes the program P, so that the functions of each of the wireless communication system and the wireless communication control apparatus are realized.

As the processor C1, for example, it is possible to use a central processing unit (CPU), a graphic processing unit (GPU), a digital signal processor (DSP), a micro processing unit (MPU), a floating point number processing unit (FPU), a physics processing unit (PPU), a tensor processing unit (TPU), a quantum processor, a microcontroller, or a combination of these. Examples of the memory C2 include a flash memory, a hard disk drive (HDD), a solid state drive (SSD), and a combination thereof.

Note that the computer C can further include a random access memory (RAM) in which the program P is loaded when the program P is executed and in which various kinds of data are temporarily stored. The computer C can further include a communication interface for carrying out transmission and reception of data with other apparatuses. The computer C can further include an input-output interface for connecting input-output apparatuses such as a keyboard, a mouse, a display and a printer.

The program P can be stored in a non-transitory tangible storage medium M which is readable by the computer C. The storage medium M can be, for example, a tape, a disk, a card, a semiconductor memory, a programmable logic circuit, or the like. The computer C can obtain the program P via the storage medium M. The program P can be transmitted via a transmission medium. The transmission medium can be, for example, a communication network, a broadcast wave, or the like. The computer C can obtain the program P also via such a transmission medium.

[Additional Remark 1]

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

[Additional Remark 2]

Some or all of the foregoing example embodiments can also be described as below. Note, however, that the present invention is not limited to the following supplementary notes.

(Supplementary Note 1)

A wireless communication control apparatus for controlling a wireless communication system which includes a plurality of wireless slave stations and a base station connected to the plurality of wireless slave stations, communication areas of the plurality of wireless slave stations including an overlapping region where communication areas of wireless slave stations overlap each other, the wireless communication control apparatus including: an information acquisition section that acquires information pertaining to a terminal which is connected to the wireless communication system; and a switching control section that switches, based on the information pertaining to the terminal, between whether the base station causes the plurality of wireless slave stations to function respectively as a plurality of separate cells or the base station causes the plurality of wireless slave stations to function as a single cell.

According to the above configuration, it is possible to secure a cell to which an optimum band is allocated while preventing cell edge interference.

(Supplementary Note 2)

The wireless communication control apparatus according to supplementary note 1, in which: the information pertaining to the terminal is positional information of the terminal.

According to the above configuration, it is possible to secure a cell to which an optimum band is allocated while preventing cell edge interference based on positional information of a terminal.

(Supplementary Note 3)

The wireless communication control apparatus according to supplementary note 1 or 2, in which: the positional information indicates whether or not to be positioned in the overlapping region.

According to the above configuration, it is possible to secure a cell to which an optimum band is allocated while preventing cell edge interference based on information indicating whether or not to be positioned in an overlapping region.

(Supplementary Note 4)

The wireless communication control apparatus according to supplementary notes 1 through 3, in which: the control section carries out the switching if the number of terminals positioned in the overlapping region is less than a predetermined value.

According to the above configuration, it is possible to secure a cell to which an optimum band is allocated while preventing cell edge interference.

(Supplementary Note 5)

The wireless communication control apparatus according to supplementary note 1, in which: the information pertaining to the terminal is a band quantity which is requested by the terminal.

According to the above configuration, it is possible to reduce occurrence of handovers and secure a cell to which an optimum band is allocated.

(Supplementary Note 6)

The wireless communication control apparatus according to supplementary note 1, in which: the information pertaining to the terminal is a communication speed of the terminal; and the control section compares a predicted value of a lowest communication speed among terminals positioned in the single cell with a predicted value of a lowest communication speed among terminals positioned in the plurality of separate cells, and carries out the switching so that a cell involving a higher one of predicted values thus compared is selected.

According to the above configuration, it is possible to select optimum cell formation.

(Supplementary Note 7)

The wireless communication control apparatus according to supplementary notes 1 through 6, further including: a distributor, the distributor switching, based on a signal from the control section, between a function as the single cell and a function as the plurality of separate cells.

According to the above configuration, it is possible to carry out signal processing at high speed.

(Supplementary Note 8)

A wireless communication system including a plurality of wireless slave stations, a base station, and a wireless communication control apparatus, the plurality of wireless slave stations having respective communication areas, the base station being connected to the plurality of wireless slave stations, and the wireless communication control apparatus including: a switching section that switches between whether the base station causes the plurality of wireless slave stations to function as respective separate cells or the base station causes the plurality of wireless slave stations to function as a single cell; an information acquisition section that acquires s information pertaining to a terminal connected to the plurality of wireless slave stations; and a control section that carries out the switching based on the information pertaining to the terminal.

According to the above configuration, it is possible to secure a cell to which an optimum band is allocated while preventing cell edge interference.

(Supplementary Note 9)

A wireless communication control method for controlling a wireless communication system which includes a plurality of wireless slave stations and a base station connected to the plurality of wireless slave stations, communication areas of the plurality of wireless slave stations including an overlapping region where communication areas of wireless slave stations overlap each other, the wireless communication control method including: acquiring information pertaining to a terminal which is connected to the wireless communication system; and switching, based on the information pertaining to the terminal, between whether the base station causes the plurality of wireless slave stations to function respectively as a plurality of separate cells or the base station causes the plurality of wireless slave stations to function as a single cell.

According to the above configuration, it is possible to secure a cell to which an optimum band is allocated while preventing cell edge interference.

(Supplementary Note 10)

A program for causing a computer to function as a wireless communication control apparatus for controlling a wireless communication system which includes a plurality of wireless slave stations and a base station connected to the plurality of wireless slave stations, communication areas of the plurality of wireless slave stations including an overlapping region where communication areas of wireless slave stations overlap each other, the program causing the computer to function as: an information acquisition means for acquiring information pertaining to a terminal which is connected to the wireless communication system; and a switching control means for switching, based on the information pertaining to the terminal, between whether the base station causes the plurality of wireless slave stations to function respectively as a plurality of separate cells or the base station causes the plurality of wireless slave stations to function as a single cell.

According to the above configuration, it is possible to secure a cell to which an optimum band is allocated while preventing cell edge interference.

(Supplementary Note 11)

A wireless communication control apparatus including at least one processor, the at least one processor carrying out: a process of forming a plurality of communication areas including an overlapping region where communication areas overlap each other; a process of acquiring information pertaining to a terminal connected in the communication area; and a process of switching, based on the information pertaining to the terminal which has been acquired, between whether to cause the plurality of communication areas to function as respective separate cells or to cause the plurality of communication areas to function as a single cell.

Note that the wireless communication control apparatus can further include a memory. The memory can store a program for causing the at least one processor to carry out: the process of forming a plurality of communication areas including an overlapping region where communication areas overlap each h other; the process of acquiring information pertaining to a terminal connected in the communication area; and the process of switching, based on the information pertaining to the terminal which has been acquired, between whether to cause the plurality of communication areas to function as respective separate cells or to cause the plurality of communication areas to function as a single cell. The program can be stored in a computer-readable non-transitory tangible storage medium.

REFERENCE SIGNS LIST

10, 20, 30, 40, 50: Wireless communication system
100, 200, 300, 400, 500, 600: Base station
101, 201, 301, 401, 501, 601: Information acquisition section
102, 202, 302, 402, 502, 602: Control section
103, 203, 303, 403, 503, 603: Wireless communication control apparatus
110: Distributor
120-129: Wireless slave station
130-139: Separate cell
130*a*: Single cell
140, 140*a*, 140*b*, 140*c*, 141, 142, 143, 144, 146, 147, 148, 149: Terminal
150: Overlapping region

The invention claimed is:

1. A wireless communication control apparatus for controlling a wireless communication system which includes a plurality of wireless slave stations and a base station connected to the plurality of wireless slave stations, communication areas of the plurality of wireless slave stations including an overlapping region where communication areas of wireless slave stations overlap each other, said wireless communication control apparatus comprising at least one processor, the at least one processor carrying out:

an information acquisition process of acquiring information pertaining to a terminal which is connected to the wireless communication system; and a switching control process of carrying out switching, based on the information pertaining to the terminal, between whether the base station causes the plurality of wireless slave stations to function respectively as a plurality of separate cells or the base station causes the plurality of wireless slave stations to function as a single cell.

2. The wireless communication control apparatus as set forth in claim 1, wherein:

the information pertaining to the terminal is positional information of the terminal.

3. The wireless communication control apparatus as set forth in claim 2, wherein:

the positional information indicates whether or not to be positioned in the overlapping region.

4. The wireless communication control apparatus as set forth in claim 3, wherein:

in the switching control process, the at least one processor carries out the switching if the number of terminals positioned in the overlapping region is less than a predetermined value.

5. The wireless communication control apparatus as set forth in claim 1, wherein:

the information pertaining to the terminal is a band quantity which is requested by the terminal.

6. The wireless communication control apparatus as set forth in claim 1, wherein:

the information pertaining to the terminal is a communication speed of the terminal; and in the switching control process, the at least one processor compares a predicted value of a lowest communication speed among terminals positioned in the single cell with a predicted value of a lowest communication speed among terminals positioned in the plurality of separate cells, and carries out the switching so that a cell involving a higher one of predicted values thus compared is selected.

7. The wireless communication control apparatus as set forth in claim 1, further comprising:

a distributor, the distributor switching, based on a signal from the at least one processor in the switching control process, between a function as the single cell and a function as the plurality of separate cells.

8. A wireless communication system, comprising:

a wireless communication control apparatus recited in claim 1;

the plurality of wireless slave stations; and the base station.

9. A wireless communication control method for controlling a wireless communication system which includes a plurality of wireless slave stations and a base station connected to the plurality of wireless slave stations, communication areas of the plurality of wireless slave stations including an overlapping region where communication areas of wireless slave stations overlap each other, said wireless communication control method comprising:

acquiring information pertaining to a terminal which is connected to the wireless communication system; and switching, based on the information pertaining to the terminal, between whether the base station causes the plurality of wireless slave stations to function respectively as a plurality of separate cells or the base station causes the plurality of wireless slave stations to function as a single cell.

10. The wireless communication control method as set forth in claim 9, wherein:

the information pertaining to the terminal is positional information of the terminal.

11. The wireless communication control method as set forth in claim 10, wherein:

the positional information indicates whether or not to be positioned in the overlapping region.

12. The wireless communication control method as set forth in claim 11, wherein:

the switching is carried out if the number of terminals positioned in the overlapping region is less than a predetermined value.

13. The wireless communication control method as set forth in claim 9, wherein:

the information pertaining to the terminal is a band quantity which is requested by the terminal.

14. The wireless communication control method as set forth in claim 9, wherein:

the information pertaining to the terminal is a communication speed of the terminal; and in the switching, a predicted value of a lowest communication speed among terminals positioned in the single cell is compared with a predicted value of a lowest communication speed among terminals positioned in the plurality of separate cells, and the switching is carried out so that a cell involving a higher one of predicted values thus compared is selected.

15. A non-transitory storage medium storing a program for causing a computer to function as a wireless communication control apparatus for controlling a wireless communication system which includes a plurality of wireless slave stations and a base station connected to the plurality of wireless slave stations, communication areas of the plurality of wireless slave stations including an overlapping region where communication areas of wireless slave stations overlap each other, the program causing the computer to carry out:

an information acquisition process of acquiring information pertaining to a terminal which is connected to the wireless communication system; and a switching control process of carrying out switching, based on the information pertaining to the terminal, between whether the base station causes the plurality of wireless slave stations to function respectively as a plurality of separate cells or the base station causes the plurality of wireless slave stations to function as a single cell.

* * * * *